United States Patent
Kuiper

(10) Patent No.: US 11,889,245 B2
(45) Date of Patent: Jan. 30, 2024

(54) SENSING DEVICE, SYSTEMS AND METHODS FOR MONITORING MOVEMENT OF GROUND AND OTHER STRUCTURES

(71) Applicant: Mindspark Technologies Pty Ltd, Brendale (AU)

(72) Inventor: Pieter Kuiper, Brendale (AU)

(73) Assignee: MINDSPARK TECHNOLOGIES PTY LTD, Queensland (AU)

( * ) Notice: Subject to any disclaimer, the term of this patent is extended or adjusted under 35 U.S.C. 154(b) by 0 days.

(21) Appl. No.: 15/761,303

(22) PCT Filed: Sep. 14, 2016

(86) PCT No.: PCT/AU2016/050855
§ 371 (c)(1),
(2) Date: Mar. 19, 2018

(87) PCT Pub. No.: WO2017/045022
PCT Pub. Date: Mar. 23, 2017

(65) Prior Publication Data
US 2018/0279020 A1    Sep. 27, 2018

(30) Foreign Application Priority Data
Sep. 17, 2015 (AU) .................... 2015903783

(51) Int. Cl.
*H04Q 9/00* (2006.01)
(52) U.S. Cl.
CPC ........... *H04Q 9/00* (2013.01); *H04Q 2209/40* (2013.01); *H04Q 2209/88* (2013.01)

(58) Field of Classification Search
CPC ........................................................ H04Q 9/00
(Continued)

(56) References Cited
U.S. PATENT DOCUMENTS 5,380,127 A * 1/1995 Caleix .................... E21B 43/29
  405/138
5,825,188 A * 10/1998 Montgomery ........... G01V 9/02
  324/345

(Continued)

OTHER PUBLICATIONS

Xu, Ning et al, A wireless sensor network for structural monitoring. ACM SenSys conference Nov. 3-5, 2004 Baltimore MD (Year: 2004).*

(Continued)

*Primary Examiner* — Albert K Wong
(74) *Attorney, Agent, or Firm* — David D. Brush; Westman, Champlin & Koehler, P.A.

(57) ABSTRACT

A device is provided for monitoring a geological region or a structure. The device includes: a sensor, a radio transmitter configured to transmit data obtained by the sensor, a power source configured to power the sensor and/or radio transmitter, and a housing configured to protect the power source, radio transmitter and optionally the sensor. The sensor is capable of sensing a parameter useful in determining movement within a geological region or a structure; and/or the potential for failure in a geological region or a structure. The devices may include several sensor types capable of sensing parameters such as strain, pressure, temperature, electrical conductivity, electrical resistance, or chemistry. A series of devices may be operable as a system, with at least some of the devices further functioning to relay radio signals transmitted by other devices of the system.

7 Claims, 2 Drawing Sheets

(58) Field of Classification Search
USPC .................................... 340/870.07; 703/35
See application file for complete search history.

(56) References Cited

U.S. PATENT DOCUMENTS

| | | | | |
|---|---|---|---|---|
| 6,119,535 | A * | 9/2000 | Tambo | G08B 21/10 |
| | | | | 73/865.8 |
| 7,263,880 | B2 * | 9/2007 | Pop | E21B 47/10 |
| | | | | 73/152.02 |
| 7,493,954 | B2 * | 2/2009 | Heller | E21B 49/081 |
| | | | | 73/152.28 |
| 7,660,439 | B1 * | 2/2010 | Lu | G06K 9/00711 |
| | | | | 348/699 |
| 8,193,929 | B1 * | 6/2012 | Siu | H04L 12/2829 |
| | | | | 340/538 |
| 8,618,934 | B2 | 12/2013 | Belov et al. | |
| 9,465,020 | B2 * | 10/2016 | Christian | G01W 1/14 |
| 9,652,975 | B1 * | 5/2017 | Riley | A01K 15/022 |
| 2002/0154029 | A1 | 10/2002 | Watters et al. | |
| 2005/0017873 | A1 | 1/2005 | Liu et al. | |
| 2006/0019695 | A1 * | 1/2006 | Miyazaki | H04W 52/0235 |
| | | | | 455/522 |
| 2008/0312846 | A1 | 12/2008 | Kessler et al. | |
| 2011/0066297 | A1 * | 3/2011 | Saberi | F16K 37/0091 |
| | | | | 700/287 |
| 2012/0086581 | A1 * | 4/2012 | Marsell | G01N 33/18 |
| | | | | 340/870.02 |
| 2012/0101729 | A1 * | 4/2012 | Cho | G01V 1/008 |
| | | | | 702/2 |
| 2013/0291013 | A1 * | 10/2013 | Choi | H04W 4/90 |
| | | | | 725/33 |
| 2013/0311140 | A1 * | 11/2013 | Schechter | H04L 67/34 |
| | | | | 702/188 |
| 2014/0167969 | A1 * | 6/2014 | Wedig | G08B 7/066 |
| | | | | 340/584 |
| 2014/0358592 | A1 * | 12/2014 | Wedig | G06Q 40/08 |
| | | | | 705/4 |
| 2017/0094475 | A1 * | 3/2017 | Nolan | H04W 4/70 |
| 2017/0124853 | A1 * | 5/2017 | Mehta | H04W 4/90 |
| 2017/0208426 | A1 * | 7/2017 | Komoni | G08C 17/02 |

OTHER PUBLICATIONS

International Search Report dated Nov. 22, 2016, for corresponding International Patent Application PCT/AU2016/050855 filed on Sep. 14, 2016.

Written Opinion of the International Searching Authority dated Nov. 22, 2016, for corresponding International Patent Application PCT/AU2016/050855 filed on Sep. 14, 2016.

Mo Li and Yunhao Liu, "Underground Structure Monitoring with Wireless Sensor Networks," 2007 6th International Symposium on Information Processing in Sensor Networks, Cambridge, MA, 2007, p. 69=78. Doi: 10.1109/IPSN.2007.437966.

Tomonori Nagayama, and Billie F. Spencer Jr., "Structural health Monitoring Using Smart Sensors," Newmark Structural Engineering Laboratory Report Series, No. 001, 2007 [retrieved from the internet on Nov. 18, 2016] <URL: http://web.archive.org/web/20100629190330/http://www.ideals.illinois.edu/handle/2142/3521> published on Jun. 29, 2010 as per way back machine Chapter 1 sections 1.1, 1.2; Chapter 2 sections 2.1.1, 2.3, 2.4; Chapter 3 sections 3.1, 3.2, Chapter 5.

* cited by examiner

SENSING DEVICE, SYSTEMS AND METHODS FOR MONITORING MOVEMENT OF GROUND AND OTHER STRUCTURES

The present application is a Section 371 National Stage Application of International Application No. PCT/AU2016/050855, filed Sep. 14, 2016, which is incorporated by reference in its entirety and published as WO 2017/045022 A1 on Mar. 23, 2017, in English.

FIELD OF THE INVENTION

The present invention relates to electronic devices for monitoring potentially geologically unstable regions for movement or failure. The invention further relates to devices for monitoring man-made structures (and particularly items of public infrastructure) for movement or failure.

BACKGROUND TO THE INVENTION

In mining, it is highly desirable to monitor the mine faces and surrounding ground for signs of movement. Unexpected movement of ground causes the potential to endanger lives, demolish equipment, or destroy property. Such movement can result in bench and highwall failures, rock falls, waste dump and stockpile failures, and the collapse of underground workings.

Slope failures are responsible for many mine fatalities. Small rockfalls, which may involve small rocks weighing only a few kilograms each, can cause fatal injuries to workers away from the protection of large machinery. Massive failures containing a million cubic meters of material or more can be fatal even for heavy equipment operators.

Close monitoring of slopes for warning signs is imperative for protecting workers and equipment. Geotechnical designs can be improved to increase factors of safety and proper mine designs can be improved to minimize rock fall hazards. However, even slopes with conservative slope designs may experience unexpected failure due to the presence of unknown geologic structures, abnormal weather patterns, or seismic shock. Unanticipated movement of any amount of rock may cause severe disruptions to mining operations, pose major safety concerns, or contribute to large financial losses for companies.

The use of electronic distance measurement equipment is known in the art for monitoring slopes. For example, a survey network may consist of target prisms placed on and around areas of anticipated instability and one or more non-moving control points for survey stations. The angles and distances from the survey station to the prisms are measured on a regular basis to establish a history of movement. A problem of this approach is that index of refraction errors may occur as a result of atmospheric variations in temperature or pressure, and human error can be a factor with manual systems.

Measuring and monitoring the changes in crack width and direction of crack propagation may be used to establish the extent of the unstable area. A simple method for monitoring tension cracks is to spray paint or flag the ends so that new cracks or propagation along existing cracks can be easily identified on subsequent inspections. Measurements of tension crack may also be as simple as driving two stakes on either side of the crack and using a survey tape or rod to measure the separations. However, stakes can become loose over time and cause inaccurate measurements. Commercial crack gages with electrical readout are also available, but often in the case of mine slope problems, the cracks exceed the measurement limits of the instruments.

Another commonly used method for monitoring movement across tension cracks is with a portable wire-line extensometer. The setup may comprised of a wire anchored in the unstable portion of the ground, with the monitor and pulley station located on a stable portion of the ground behind the last tension crack. The wire runs over the top of a pulley and is tensioned by a weight suspended from the other end. As the unstable portion of the ground moves away from the pulley stand, the weight will move and the displacements can be recorded either electronically or manually. Electronic monitoring equipment can be programmed to set off alarms if the displacement reaches certain threshold limits. A problem is that long lengths of wire can lead to errors due to sag so readjustments and corrections are often necessary.

Inclinometers are another tool used in the prior art for monitoring rock movement. An inclinometer may consist of a casing that is placed in the ground through the area of expected movements. The end of the casing is assumed to be fixed so that the lateral profile of displacement can be calculated. The casing has grooves cut on the sides that serve as tracks for the sensing unit. The deflection of the casing, and hence the surrounding rock mass, are measured by determining the inclination of the sensing unit at various points along the length of the installations. A problem is that if the bottom of the inclinometer is not in stable ground, the instrument may "float" in the failure zone and give erroneous readings. Excessive horizontal movement may deflect the casing so much that the sensing torpedo will not be able to pass the bend to take readings.

Time Domain Reflectometry (TDR) is a technique of the prior art in which electronic pulses are sent down a length of a coaxial cable which has been grouted in a drillhole. When deformation or a break in the cable is encountered, a signal is reflected giving information on the subsurface rock mass deformation. A problem with TDR cables is the propensity for cable breakage when disrupted by a mining activity or gross ground movement.

Another approach includes the use of a tensioned rod extensometer to detect and monitor changes in distance between one or more anchors in a borehole and the borehole collar. Changes in the distance between the anchor and the rod head provide the displacement information for the rock mass. These instruments are fairly expensive when compared to other instrumentation options, and are therefore, not suitable for surveillance of large areas of a pit.

The prior art provides remote-sensing technologies as tools to monitor slopes for hazards and to assess slope stability. For example, hyperspectral imaging has been used to provide improved geologic maps of potentially unstable alteration zones on mine slopes. Furthermore, interferometric radar devices capable of detecting very small displacements on slopes awaits final assembly and field testing. Computerized monitoring methods using images from digital and video cameras have also been proposed for application to mine slope surveillance. Such approaches have not been validated by any controlled study.

Large civil structures such as dams, buildings, bridges and highways may also require monitoring for movement and other indicators of the potential for failure. The surrounding ground of such structures may also be monitored. Many methods used in mining are also applicable in these settings, including visual surveillance, telemetry, inclinometers, remote sensing, siting rods and the like.

It is an aspect of the present invention to provide improved devices, systems and methods for monitoring the ground and/or man-made structures for movement and also failure potential. It is a further aspect to provide a useful alternative to the prior art.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY OF THE INVENTION

In a first aspect, but not necessarily the broadest aspect the present invention provides a device for monitoring a geological region or a structure, the device comprising: a sensor, a radio transmitter configured to transmit data obtained by the sensor, a power source configured to power the sensor and/or radio transmitter, and a housing configured to protect the power source, radio transmitter and optionally the sensor, wherein the sensor is capable of sensing a parameter useful in determining movement within a geological region or a structure; and/or the potential for failure in a geological region or a structure.

In one embodiment, the device comprises a radio receiver configured to receive data transmitted by a second device.

In one embodiment, the sensor of the device is configured to obtain environmental data and/or position/orientation data. The environmental data may be data relating to any one or more of strain, pressure, temperature, electrical conductivity, electrical resistance, or chemistry.

In one embodiment of the device, the position/orientation data is data relating to the position/orientation of the device at two or more time points, and/or the position of the device relative to a point or region in space. The point in or region in space may be at or about a second device.

In one embodiment of the device the sensor is a pressure sensor, a strain gauge, a microphone, and accelerometer, and inertial measurement unit, a temperature sensor, an electrical sensor, or a chemical sensor.

In one embodiment, the device comprises at least 2, 3, 4 or 5 sensors.

In one embodiment, the device is devoid of a connecting cable or wire.

In one embodiment of the device the radio transmitter (and radio receiver, where present) is/are configured to be operable within a mesh network.

In a second aspect the present invention provides a system for monitoring a geological region or a structure, the system comprising the device as described herein, and a data receiving device configured to receive data transmitted by the device as described herein.

In one embodiment, the system comprises one or more further devices, the one or more further devices as described herein.

In one embodiment of the system at least two, or all, of the devices are configured so as to form a mesh network.

In one embodiment of the system, the average distance between devices is sufficiently short so as to allow for transmission of data between devices yet prevent discharge of the power source of the device before expiration of a predetermined period. The predetermined period may be at least about 1, 2, 3, 4, 5, 6, 7, 8, 9 or 10 years.

In one embodiment of the system, where the geological region is predominantly rock, the average distance between devices is less than about 1, 2, 3, 4, 5, 6, 7, 8, 9, 10, 15, 20, 25, 30, 35, 40, 45, 50, 55, 60, 65, 70, 75, 80, 85, 90 or 100 meters In one embodiment, the system comprises data processing means configured to receive data from the devices(s).

In one embodiment, the system comprises processor-executable software configured to analyze the data received from the devices. The software may be configured to determine a failure, or the potential for failure of the geological region or structure in or about which the device(s) is/are disposed.

In a third aspect, the present invention provides a method for monitoring a geological region or a structure, the method comprising disposing one or more devices as described herein within or about a geological region or a structure. In one embodiment, the device(s) is/are buried within the geological region or the structure.

In one embodiment, the method comprises providing the system as described herein, and disposing the device(s) within or about the geological region or the structure.

In one embodiment of the method, the geological region is about a mine or other potentially geologically unstable area.

In one embodiment of the method, the structure is a wall (including a retaining wall, a dam wall or a levy wall), or a platform (including a foundation, a road, a pavement, or a floor), or a support (including a pier, a pile, a pylon, and a span), or an anchorage.

In one embodiment, the method comprises the step of receiving data transmitted by the device(s) and processing the data to determine a failure, or the potential for failure of the geological region or structure in or about which the device(s) is/are disposed.

In one embodiment of the method the data is obtained from at least 2, 3, 4, or 5 different sensor types are used to determine a failure, or the potential for failure of the geological region or structure in or about which the device(s) is/are disposed.

In another embodiment, the invention provides a method for configuring one or more of the device(s) as described herein comprising altering signal wavelength, signal power, antenna length/design, power source, or a network protocol parameter stored therein (where present) in order to achieve utility in a desired situation.

DETAILED DESCRIPTION OF THE INVENTION

Figure 1:
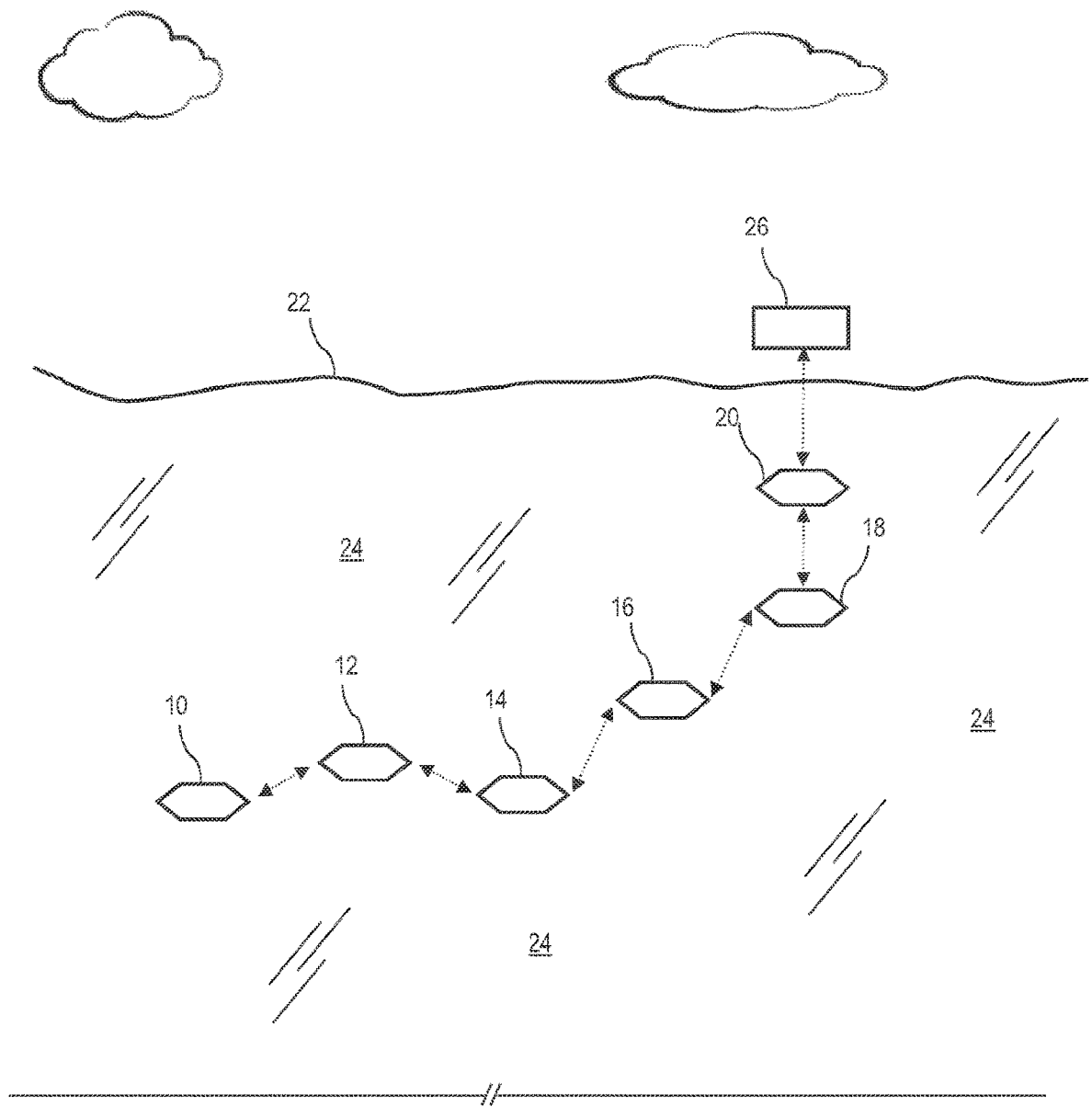
FIG. 1 is diagrammatic representation of a system of the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and from different embodiments, as would be understood by those in the art.

In the claims below and the description herein, any one of the terms "comprising", "comprised of" or "which comprises" is an open term that means including at least the elements/features that follow, but not excluding others. Thus, the term comprising, when used in the claims, should not be interpreted as being limitative to the means or elements or steps listed thereafter. For example, the scope of the expression a method comprising step A and step B should not be limited to methods consisting only of methods A and B. Any one of the terms "including" or "which includes" or "that includes" as used herein is also an open term that also means including at least the elements/features that follow the term, but not excluding others. Thus, "including" is synonymous with and means "comprising".

In a first aspect the present invention provides a device for monitoring a geological region or a structure, the device comprising:
  a sensor,
  a radio transmitter configured to transmit data obtained by the sensor,
  a power source configured to power the sensor and/or radio transmitter, and
  a housing configured to protect the power source, radio transmitter and optionally the sensor,
wherein, the sensor is capable of sensing a parameter useful in determining movement within a geological region or a structure; and/or the potential for failure in a geological region or a structure.

Applicant proposes that a device having environmental and/or position/orientation sensing capabilities, and also having the ability to effect radio communication with a receiving device or another similar device is useful in monitoring the ground and also structures.

The use of two or more sensor types may improve accuracy in monitoring for potential failure. For example, an increase in water pressure and a position change may give a higher indication of impending failure as compared with a position change alone. Furthermore, the use of two or more devices provides further advantage in so far as comparison of data is allowed across a region and also the ability to relay data from device to device. Furthermore, combining sensor types allows for multiple monitoring applications to be provided in a single installation or location (such as a single drill hole), and allow for the measurement of several physical properties at the each device location.

A particularly preferred embodiment of the invention relates to a system of devices, and whereby the devices are configured so as to allow for the relay of data from device to device. Ultimately, the final device in a chain of devices may transmit data to a proximal receiving device. Thus, a chain of devices may be implemented across a region.

Advantageously, the present systems do not necessarily require cable to communicate data and receive power. This approach provides practical benefit in the field of monitoring natural or built environments by enabling monitoring of environments in locations where cables cannot be laid because of poor access to place the cable, where a cable cannot be maintained, or a cable conflicts with other site requirements The present systems in some embodiments allow monitoring in areas where cables would be easily damaged by traffic, blasting or ground movement. Simplified installation is also provided in that multiple locations can be monitored without multiple cables.

The devices may be placed using a diverse range of placement mechanisms, and can be placed in diverse locations and will typically hold their position.

Furthermore, the system can be extended or repaired by adding devices in the proximity to any existing devices of the system, and without the need to physically access the existing devices.

The skilled artisan is aware of networking protocols allowing the use of multiple radio receivers and transmitters to relay or propagate a radio signal. Such protocols include so-called mesh networking protocols. As is understood by the skilled person mesh networking is a type of networking where each node must not only capture and disseminate its own data, but also serve as a relay for other nodes, that is, it must collaborate to propagate the data in the network. In the context of the present invention, each device disseminates data obtained from sensors, and also acts as a node itself to relay data disseminated by other devices, the network being configured to carry data to a receiving device.

A mesh network can be designed using a flooding technique or a routing technique. When using a routing technique, the message propagates along a path, by hopping from node to node until the destination is reached. To ensure all its paths' availability, a routing network must allow for continuous connections and reconfiguration around broken or blocked paths, using self-healing algorithms. A mesh network whose nodes are all connected to each other is a fully connected network. Mesh networks can be seen as one type of ad hoc network.

Accordingly, in one embodiment of the method the device(s) (the first device, the second device, or any one or all of the plurality of devices) is adapted to relay sensed data. Stated another way the devices are adapted to transmit the data by a mesh networking protocol. In this embodiment, the devices form a network, whereby the data is passed from one device to another device, to yet another device and so on, before arriving at a receiving device. Thus, a single device may have the three functions of sensing, transmitting the sensed data to a second device, and relaying the data transmitted from a third device to the second device. Prior art protocols may be utilized in the present invention (with any modifications required to suit the present invention), or indeed a protocol may be devised de novo.

A protocol is typically required to propagate a message across nodes in an installed network, via all nodes or a via a subset of all nodes. The protocols selected are based on requirements for static structures, for example monitoring slope stability, and unstable structures such as those involved with ore flow monitoring. In this system an important requirement of a protocol is to minimise power consumption.

The protocol may be designed so as to limit or minimize the amount of time that a device is receiving (or capable of receiving), and or transmitting (or capable of transmitting) data. Such approaches further extend battery life. For example, the protocol may dictate that data is transmitted only at certain intervals of time such that for the majority of time power is not used to maintain constant communication between devices. Alternatively, the protocol may dictate that a radio transmitter is substantially inactive until it receives a radio signal from another device. It will be appreciated that such features of the protocol may alternatively embodied within the firmware of each device of the invention.

The protocol may be "self-healing" such that the system of devices is still operable where one of the devices is rendered inoperable. In such a protocol, where a first device transmits data to a second device, and the second device to a third device, and where the second device is rendered inoperable, the first device transmits information to the third device. The first device may be configured so as to increase power output so as to take account of the increased distance of transmission, and this may in turn result in a decreased battery life. However, the system will in these circumstances still remain operable for some time, as distinct from being rendered completely inoperable due to the failure of a single device. Such back-up features in the system may be highly advantageous where the accessibility of the devices is very limited after installation.

Battery power may be also saved where the device is configured so as to transmit data only where there is an appreciable change in data obtained by the sensor. For example, where an orientation sensor detects only a minor tilt in the device no signal is transmitted, but when a major tilt is detected the radio transmitter is made operational. In this way, data which is not substantially informative over previously transmitted data is not transmitted leading to a waste in battery power. Other means for limiting power use include the use of a protocol that minimizes "hops" in a network pathway, as further explained. The cost of sending a message across any distance in the network is measured in hops. A hop is the complete transaction between adjacent devices when moving a message. The hop count along a path from a given source to a given destination is the number of devices required to handle or deal with the message. If a protocol can reduce the hop count the power consumption is proportionally reduced.

Where possible the route is predetermined. Based on the installation plan, this allows for minimal hop counts for messages and/or known alternate routes to reduce throughput for individual devices. This can be important consideration for an installation along a bore hole. Without routing alternatives the devices at the top of the hole must retransmit every message. If devices can communicate "around" adjacent devices to the next device in a hole, only half the devices in the bore hole need be involved in the transmission of any one message. By varying which devices to transmit, from message to message, power consumption is reduced for all devices in the whole hole.

The protocol may also be configured such that processing of routing decisions is not carried out by each device that handles a message. This reduces power consumption when relaying a message.

As an installation of devices ages, movement in the surrounding structure will cause some devices to become unusable, thereby altering the options for routing a message. Furthermore, some devices will lose battery power before others in a route, and will be the first to be lost to the network. Also, a network may be unintentionally installed out of order and require some patching to allow predetermined routing. Predetermined routing based on the install plan may require augmentation from additional routing protocols with the ability to discover.

The system may be configured to allow neighbour discovery as a first alternative for repair to the routing plan from the original install plan. The protocol assesses which device is responding to a transmission other than the intended recipient device. In many instances, this approach is sufficient to repair stable installations with incremental changes over time.

Where an installation is unstable and changing rapidly due the nature of the surrounding structure, the system may be configured to use flooding methods as used in mobile or mesh networks to route individual messages. Flooding and similar routing protocols require the maximum number of devices to be involved and necessarily requires many retries with possible time outs or failures to complete. This approach requires significant power and is only practical when circumstances require it.

The protocol may be configured to also keep transmission periods as short as possible, allowing minimal overlap between adjacent devices, and reducing output power when the received signal strength is high.

In one embodiment, the device comprises one or more sensors and furthermore is configured to transmit and receive data by radio means. Accordingly, the device may be configured to (i) receive data from a second device and relay that data (either to a third device or a receiving device), and also (ii) collect its own data (from its sensor(s)) and transmit that data (either to a third device or a receiving device).

An advantage of a wireless network as described herein is the avoidance of any need to physically connect individual devices (by way of wire or cable, for example). Such physical connections complicate installation, and are also prone to breakage.

Battery life is a considerable problem in such wirelessly networked devices. Given the not trivial task of installing and retrieving the devices it is important that battery life can be measured in years, rather than weeks or months.

Contrary to the requirement of extended battery life is the power consumption of the electronics of the device. In particular, the transmission of data by radio means consume significant power. The present devices and systems in some embodiments are configured so as to reduce or minimize power consumption. An important finding of the present inventors is that the selection of wavelength in conjunction with the distance between devices provides for a system that is operable for at least one year based on current battery technology. In particularly advantageous embodiments of the invention, the device is configured so as to provide significantly more than one year of operation. Improvements in battery technology may, of course, even further extend the operating life of the present devices.

As will be appreciated by the skilled person, in configuring a device or system of the present invention consideration should be taken of the medium (or media) through which the radio signal must travel. For example, rock and soil significantly attenuate a radio signal over distance. To improve transmission range in situations where attenuation issues are problematic (which will likely be the majority case), the radio transmitter may be configured so as to utilize relative long wavelength signals to transmit the data. Long wave radio signals are more able to penetrate rock, soil and concrete thereby improving range. In one embodiment, the radio signals have a wavelength of more than about 1 m, 2 m, 3 m, 4 m, 5 m, 6 m, 7 m, 8 m, 9 m, 10 m, 11 m, 12 m, 13 m, 14 m, 15 m, 16 m, 17 m, 18 m, 19 m, 20 m, 21 m, 22 m, 23 m, 24 m, 25 m, 26 m, 27 m, 28 m, 29 m, 30 m, 31 m, 32 m, 33 m, 34 m, 35 m, 36 m, 37 m, 38 m, 39 m, 40 m, 41 m, 42 m, 43 m, 44 m, 45 m, 46 m, 47 m, 48 m, 49 m, 50 m, 60 m, 70 m, 80 m, 90 m, 100 m, 200 m, 300 m, 400 m, 500 m, 600 m, 700 m, 800 m, 900 m, 1000 m, 2000 m, 3000 m, 4000 m, 5000 m, 6000 m, 7000 m, 8000 m, 9000 m, or 10,000 m. In another embodiment, the radio signals may have a frequency of less than about 1 kHz, 10 kHz, 100 kHz, 1 MHz, 2 MHz, 3 MHz, 4 MHz, 5 MHz, 6 MHz, 7 MHz, 8 MHz, 9 MHz, 10 MHz, 11 MHz, 12 MHz, 13 MHz, 14 MHz, 15 MHz, 16 MHz, 17 MHz, 18 MHz, 19 MHz, 20 MHz, 21 MHz, 22 MHz, 23 MHz, 24 MHz, 25 MHz, 26 MHz, 27 MHz, 28 MHz, 29 MHz, 30 MHz, 31 MHz, 32 MHz, 33 MHz, 34 MHz, 35 MHz, 36 MHz, 37 MHz, 38 MHz, 39 MHz, 40 MHz, 41 MHz, 42 MHz, 43 MHz, 44 MHz, 45 MHz, 46 MHz, 47 MHz, 48 MHz, 49 MHz, 50 MHz, 60 MHz, 70 MHz, 80 MHz, 90 MHz, 100 MHz, 110 MHz, 120 MHz, 130 MHz, 140 MHz, 150 MHz, 160 MHz, 170 MHz, 180 MHz, 190 MHz, 200 MHz, 210 MHz, 220 MHz, 230 MHz, 240 MHz, 250 MHz, 260 MHz, 270 MHz, 280 MHz, 290 MHz, 300 MHz, 310 MHz, 320 MHz, 330 MHz, 340 MHz, 350 MHz, 360 MHz, 370 MHz, 380 MHz, 390 MHz, or 400 MHz.

Where the frequency is less than about 14 MHz, magnetic transmission means may be used in whole or part of the radio transmission means.

In some embodiments of the invention, the radio signals have a frequency of between about 100 kHz and about 30 MHz. The frequency may be less than about 200 kHz, 300 kHz, 400 kHz, 500 kHz, 600 kHz, 700 kHz, 1 MHz, 2 MHz, 3 MHz, 4 MHz, 5 MHz, 6 MHz, 7 MHz, 8 MHz, 9 MHz, 10 MHz, 11 MHz, 12 MHz, 13 MHz, 14 MHz, 15 MHz, 16 MHz, 17 MHz, 18 MHz, 19 MHz, 20 MHz, 21 MHz, 22 MHz, 23 MHz, 24 MHz, 25 MHz, 26 MHz, 27 MHz, 28 MHz, 29 MHz, 30 MHz. For each of these preferred aforementioned frequencies, a figure of 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% may be added or subtracted.

In some embodiments, the frequency is within the ISM (Industrial, Scientific and Medical) bands. The ISM bands are reserved internationally high power applications such as heating equipment that may disrupt radio communications of other devices using that frequency. Equipment operating in these bands tolerate interference produced by ISM equipment. The frequency may be in the range of from about 13.553 MHz to 13.567 MHz. In a highly preferred embodiment the frequency is about 13.56 MHz. Other useful frequencies include 124.2 kHz, 128 kHz, 134.2 kHz, and 27 MHz.

A frequency may be selected in part for a non-technical reason, such as a regulatory reason or a legal reason. For example, a frequency may be chosen so as to avoid the need for the user to obtain a license to operate a marker or system of the present invention.

With regard to signal power, it may be necessary to limit signal power to a when transmitting close to blasting operations. For example, testing at 13.56 MHz indicated a minimum safe distance of 300 mm for Dyno Nobel™ electric detonator types, and 100 mm for electronic detonator types. For Orica™ electric detonator types, a minimum safe distance of 1000 mm is proposed, and 100 mm for electronic detonator types. As will be understood by the skilled artisan having the benefit of the present specification, routine testing would be required to ascertain minimum safe distances for other frequencies and detonator types.

The transmitter or transmitter/receiver is capable of transmitting (and optionally receiving) such long wave radio signals. Preferably, a low power high efficiency device is used so as to extend battery life. In embodiments of the invention where the device is caused to intermittently "sleep", the power-up time is preferably short such that data may be almost immediately transmitted or received thereby limiting wastage of battery power.

A further complication arises due to antenna efficiency. Antenna efficiency describes the ratio between power put into the antenna and the power that is emitted by the antenna. Low efficiency result in high power losses. Antenna efficiency is a function of matching the antenna dimensions with emitted radio wave length. The greater the difference between the size of the antenna and the radio wave length, the lower will be the antenna efficiency. The longer wavelength radio transmissions preferred according to the present invention require larger antenna dimensions to maintain antenna efficiency. However, contrary to the requirement of a larger antenna is the requirement (at least in some embodiments) for the antenna to be fitted within the housing.

From the above, it will be appreciated that the use of a relatively small antenna for relatively long wave data transmission creates a problem with regard to antenna efficiency. Thus, higher power inputs are required to overcome the efficiency problem, with that in turn being detrimental to battery life.

A further problem presented by the use of long wave radio transmissions is the limitation in data carrying capacity. Low bit rates present a significant issue, especially where sensors generate significant amounts of data that must be transmitted to another device or to a receiving device. To overcome the problem of low bit rates, extended transmission times are required which, again, has a negative effect on battery life.

As will be appreciated, the requirements of battery life, antenna size, bit rate, and signal attenuation present significant difficulties to the practical implementation of a device to wirelessly transmit data obtained from a sensor through rock, soil or concrete. Applicant proposes that the competing requirements can be satisfied (at least to some extent) by the use of multiple devices, with each device capable of relaying information to another device so as to propagate the data by "hopping" from one device to the next (as described supra). In this way, the devices may be disposed relatively closely to each other so as to lower the importance of signal attenuation issues. Where the detrimental effects of attenuation are lowered the signal wavelength may be shortened which in turn allows for use of a shorter antenna, and therefore higher antenna efficiency), higher bit rates, and shorter transmission times. In turn, lower power consumption is required which affords a longer battery life.

Thus, Applicant's proposal to use multiple devices within a system of relaying data from device to device concomitantly overcomes multiple problems to result in a practical way to transmit data.

With regard to distances between devices in a system, it will be appreciated that regard should be had to the wavelength used for radio transmission, as well as the size and type of antenna used in the device. Regard should also be had to the medium through which the radio transmission occurs, given the ability for various media to attenuate radio signals.

Accordingly, the distance between devices is generally dictated by the aforementioned parameters rather than vice-versa. In any event, an advantage of the present invention is that virtually any issue of attenuation, antenna size, bit rate, power consumption or battery life may be addressed by simply adding more devices to the system. More devices provides for shorter distances between devices, with shorter distances having a positive effect on the aforementioned factors.

In some embodiments, not all devices in the system have sensing capabilities with some intended merely to relay data. Similarly, some devices in the system are capable only of transmitting data but have no ability to relay data.

Having the benefit of the present specification, the skilled person is enabled to select an appropriate radio transmitter for incorporating into the device. Without limitation, the radio transmitter may operate by one or more of: a propagating electromagnetic field, an inductively coupled magnetic field, a capacitively coupled electric field, a rotating magnetic field.

The sensor(s) of the present devices may detect an environmental parameter. Such parameters may be mechanical, chemical, physical or electrical in nature, and potentially useful in determining the probability of failure in the medium.

In one embodiment, the environmental sensor is a pressure sensor such as a pore-water pressure sensor. The measurement of pore pressure is important to determine the amount of water present is a medium. In mines piezometers may be used to measure pore pressures and may provide valuable data for evaluating the effectiveness of mine dewatering programs and the effects of seasonal variations. Excessive pore pressures, especially water infiltration at geologic boundaries, are responsible for many slope failures. Data on water pressure is important in maintaining safe slopes since water behind a rock slope will decrease the resisting forces and will increase the driving forces on potentially unstable rock masses.

The environmental sensor may measure resistance. Electrical resistivity may provide useful information on the stability of soil, being related to soil properties such as moisture content, degree of saturation, permeability and salinity.

The environmental sensor may measure temperature. Ground-temperature measurements can successfully identify water paths within the ground, with such paths potentially correlating with a potential failure zone.

The environmental sensor may be chemical or electrochemical in nature and measure pH, or detect chemical species such as ions or molecules (such as hydrocarbons).

The environmental sensor may be a stress/load sensor (such as a strain gauge load cell). Such devices are known to the skilled artisan, and can measure axial strain, axial and biaxial strain or may be a fully triaxial cell with resistance strain gauges.

The environment sensor may detect sound (such as a microphone, geophone or hydrophone).

In other embodiments, the environmental sensor is a magnetometer.

Other electronics such as a chronometer, additional radio transmitters and receivers may also be incorporated into the device.

The sensor may be a position sensor configured to provide an indication of the movement of a ground region or a structure region relative to a point of reference. The point of reference may be within the region or structure within which the device is disposed, or some other point in space. Sensed changes in position of the device may be reflective of changes in the surrounding medium which are indicative of potential failure.

The sensor may be an orientation sensor configured to provide an indication of the orientation of the device relative to a point of reference, or even orientation of the device relative only to a previous orientation.

Some sensors are compound and have position and orientation detection means.

A position/orientation sensor useful in the context of the present invention includes an inclinometer. As known to the skilled person an inclinometer is an instrument for measuring angles of slope and inclination of an object with respect to its gravity by creating an artificial horizon. It is also known as an angle indicator, bubble level, clinometer, gradiometer, level gauge, digital protractor, slope meter, and tilt sensor.

The position/orientation sensor may be an accelerometer in a single, dual, or tri axial package. Similar to an inclinometer (however providing more sophisticated data) an accelerometer allows sensing of the orientation of the device. In some applications, the titling or rotation of the device provides information on the surrounding ground or structure important in identifying movement and the potential for failure.

The position/orientation sensor may be an inertial measurement unit (IMU). Such units provide multiple degrees of freedom (DOF). Some units provide six dimensional motion sensing from a single device over six degrees of freedom by sensing translational movement in three perpendicular axes (surge, heave, sway) and rotational movement about three perpendicular axes (roll, pitch, yaw). Every change in the orientation of the device will produce a gyroscope signal which subsequent to making the Earth rotation rate correction, describes the amount of rotation of the acceleration vector away from the navigation coordinate system. After the acceleration vector has been transformed to the navigation coordinate system it is necessary to differentiate between the (required) acceleration and the disturbing effects of gravity as well as centripetal and Coriolis acceleration. The reason for this is that the acceleration sensors should detect only movements in relation to the inertial space. In the next step the integration over time of the (required) acceleration yields the speed of the carrier in navigation coordinates. The integration of the speed then gives the distance covered and consequently the position of the carrier.

IMU's provide very detailed position/orientation information which may in turn provide more complete information on the surrounding ground or structure In one embodiment, the device comprises at least one position/orientation sensor and at least one environmental sensor.

In one embodiment, the device comprises at least 2, 3, 4 or 5 position/orientation sensors.

In one embodiment, the device comprises at least 2, 3, 4 or 5 environment sensors.

As an example of useful a sensor combination is the use of a three axis accelerometers with a magnetometer to provide tilt with direction measurement to describe deformation of structures.

As a further example of usefulness a sensor combination is the use of pressure sensor, tilt and magnetometer sensor to measure pore pressure and ground movement.

As a further example of usefulness of a sensor combination is the use of pH, conductivity, hydrocarbon and temperature sensors to measure changing ground water quality.

As a further example of usefulness of a sensor combination is the use of a three axis accelerometers, a magnetometers and a rate gyroscope coupled with a maths processor and Kalman filter to measure spatial movement during a blasting sequence in a body of ore.

As a further example of usefulness of a sensor combination is the use of a geophone and chronometer to sense local rock fracturing, as both general and scheduled events.

In some embodiments of the device the sensor, at least one of the sensors, is an extensometer. For example, a rod-type borehole extensometer may be functionally associated with one or more other sensor types. In one embodiment, the extensometer has a head region which incorporates one or more further sensors (including any of those described elsewhere herein) as well as the radio transmitter and power source. The head region is typically protected by a housing as further described elsewhere herein. In this embodiment, the extensometer performs the function of sensing but also acts to relay sensed information from other similar devices, or relay sensed information from devices which have different sensors or a different combination of sensors. Thus in a system of the present invention, a first device disposed deep in a rock structure may have a chemical sensor and a geophone, with that sensor relaying sensed information to an extensometer-only sensor which is located closer to the surface.

As a further example of useful a sensor combination is the use of secondary transmitter and receiver to bridge sub networks without cabling.

As will be appreciated, the type of battery used as the power source should provide the longest possible life taking into account the size constraints of the housing, and also the economics. Selection of battery type will be influenced by efficiency of the network protocols, which in turn affect power use in a device. A device cannot have its power source recharged, and its useful life is limited by the volume of traffic on the network. Battery chemistries useful in some embodiments include LiMn, LiFL and LiSO.

The function of the housing is to protect the electronics from one or more of physical damage, shock, vibrations, ingress of water, gas or chemicals, extremes in temperature and the like. Importantly, the device will preferably be capable of withstanding the effects of nearby blasting. The housing may comprise one or more of the following features to protect the enclosed the electronics:

Composite materials, epoxy/fibreglass, as the potting medium internally,

Shock isolation from the potting medium for the PCB with a closed cell foam wrapping, Individual delicate components on the PCB are encapsulated with a low yield strength plastic medium to locally bypass destructive deformation when the casing experiences high loads, A low density, low modulus barrier around the batteries and PCB as a whole acting to provide, Crack stopping from outer potting to potting local to the PCB, Bypassing of large deformations Shock isolation, An impact resistant, high strength amorphous thermoplastic with good ablative properties as the outer sheath.

The housing may not be continuous. For example, where a sensor must have direct contact with the environment (such as a piezoelectric detector) the housing may comprise an aperture for the sensing part of the sensor to extend, or at least a wire connection thereto. It will be appreciated that in some circumstances (such as for a stress sensor) it will desirable to dispose all or most of the sensor outside the housing so as to provide sufficient contact with the surrounding medium. In these situations, a wire connecting the sensor to the main electronics of the device may pass through an aperture of the device housing.

The device may further comprise an analogue to digital converter where the sensor outputs analogue data. Data conversion is firstly required before communicating the converted digital data to the radio transmitter.

Where on board processing of data is required, a microprocessor is included in the device. A microprocessor may be further configured to act as a microcontroller to control various electronics such as the radio receiver/transmitter, the sensor, power regulator, memory module and the like.

An antenna is required to receive and transmit radio signals. As discussed elsewhere herein, the dimensions of the antenna may be arrived at by a consideration of the signal wavelength used, a desired antenna efficiency, the desired battery life, the size of the housing, the amount and shape of free space within the enclosure etc. Broadly, however, loop types of antenna are useful in the context of the present invention. This type of antenna has a useful propagation pattern for most installation schemes. A loop antenna may be combined with ferrite material to increase sensitivity. There is one significant minima in its radiation pattern, reducing transmission for axial aligned devices when the antenna planes are perpendicular. This may be overcome by the use of two antennas with the planes orientated perpendicular to each other. The signal is switched in software between the antennas, to optimize the signal strength and radiation pattern.

The antenna preferably extends to the maximum internal dimensions of the case. The device's antenna length is short compared to the wavelength, and therefore may be made to function optimally with high quality passive components in the loading network. High accuracy and low equivalent series resistance in the loading network typically provides adequate power output. However this may lead to an antenna with a high Q and therefore a high sensitivity to mechanical tolerances and the dielectric properties of any potting medium used. A device may require testing of antenna parameters with some requirement for manual tuning before potting.

Reference is now made to FIG. 1 which shows a system of the present invention comprising multiple devices 10, 12, 14, 16, 18, 20 disposed below the ground surface 22. In one form of the system, each of the devices comprises an environmental sensor and a position/orientation sensor, a radio transmitter/receiver with antenna, and a battery. The sensor data obtained by device 10 is transmitted through the ground 24 (as shown by the dotted arrows) from device 10 to device 12, then to device 14, then to device 16, then to device 18, then to device 20. Device 12 also obtains sensor data and relays that data separately to the data received from device 10 to device 14, then to device 16, then to device 18, then to device 20. Device 14 also obtains sensor data and relays that data, and so on. The last device in the chain (device 20) transmits data to a receiving device 26. The receiving device 26 typically comprises computing means configured to analyze the data from all devices by algorithmic means to inform whether or not there has been, or there is the potential for, failure of the ground 24.

In some embodiments, each device comprises data storage means such that data is stored until an opportune time for transmission. The data may be transmitted only according to a predetermined schedule, or when otherwise directed to by the receiving device 26 or any other device. While it is contemplated that some data processing may be carried out on board a device, this is preferably avoided (or at least minimized) so as to limit power consumption.

Some variations to the above scheme are anticipated. The device 10 may be configured to obtain sensor data, and to only transmit that data to device 12. Given that device 10 is not involved in relaying data from other devices there is no need for it to receive and store data, and the associated power consumption.

As another example, only devices 10, 12 and 14 may be configured to obtain sensor data with devices 16, 18 and 20 configured only to relay the data of devices 10, 12 and 14 to the receiving device 26.

Figure 2:
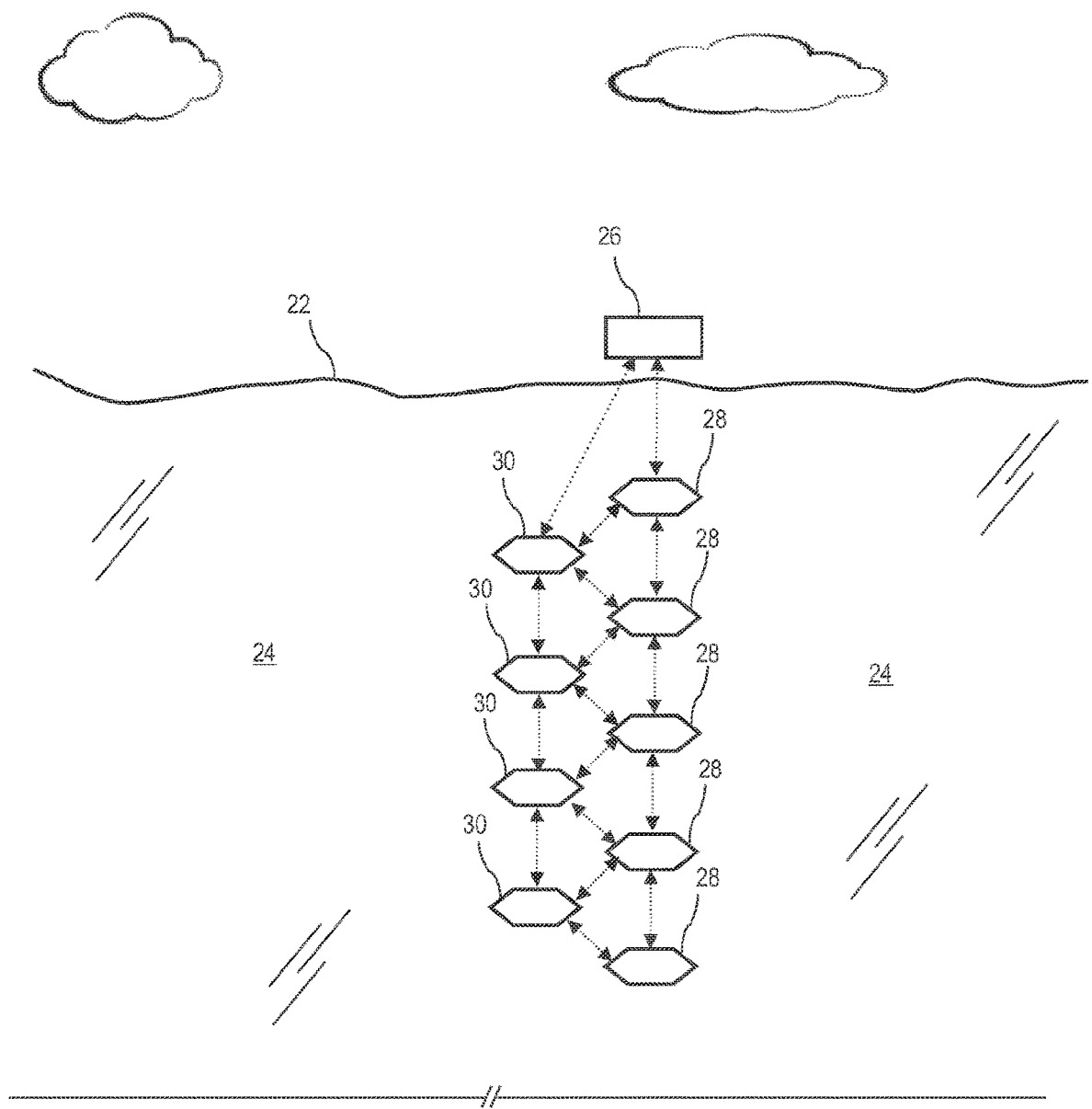
FIG. 2 is diagrammatic representation of a high redundancy system of the present invention.

FIG. 2 shows a high redundancy system configured for high redundancy comprising a core set of devices 28, and a set of back-up devices 30. In the event of failure of any of the core devices 28, any one of the back-up devices can be made operable (by way of the networking protocol, or the receiving device 26) so as to substitute for an inoperable core device. In this system, the back-up devices may comprises sensors so as to provide data that would otherwise be provided by an inoperable core device. While high redundancy systems such as this would add expense, where the monitoring is critical and replacement of an inoperable device would be very difficult the economic penalty of installation may be outweighed by the higher reliability.

The failure for which the present invention may be configured to detect or predict may be a plane failure. In mining, plane failures occur when a geologic discontinuity, such as a bedding plane, strikes parallel to the slope face and dips into the excavation at an angle steeper than the angle of friction.

The failure may be a wedge failure which occurs when two discontinuities intersect and their line of intersection "daylights" in the mining face.

The failure may be a step path failure. This type of failure is similar to plane shear failure, but the sliding is due to the combined mechanisms of multiple discontinuities or the tensile failure of the intact rock connecting members of the master joint set.

The failure may be a raveling failure. Weathering of material and expansion and contraction associated with freeze-thaw cycles are principle causes of raveling. This type of failure generally produces small rockfalls, not massive failures.

The failure may be a toppling failure. Toppling can occur when vertical or near-vertical structures dip toward the pit.

Where adapted to a structure, the failure may be any one or more of the many types of failure known in civil engineering including overloading failure, corrosion failure, freeze/thaw failure, chemical failure (such as alkali-aggregate reaction), shrinkage failure, expansion failure, design flaw failure, construction flaw failure, disintegration failure, delamination failure, subsidence failure, weather-related failure, water-related failure, and the like.

In the description provided herein, numerous specific details are set forth. However, it is understood that embodiments of the invention may be practiced without these specific details. In other instances, well-known methods, structures and techniques have not been shown in detail in order not to obscure an understanding of this description.

In the following claims, any of the claimed embodiments can be used in any combination.

The invention claimed is:

1. A system comprising:
a plurality of devices buried in a movable ground region of a mine, each of which comprises:
one or more sensors configured to sense one or more parameters useful in determining movement and/or the potential for movement in a movable ground region of a mine and output the one or more parameters as sensor data;
a radio transmitter configured to transmit sensor data to another of the plurality of devices;
a radio receiver configured to receive sensor data from another of the plurality of devices;
a power source configured to power the radio transmitter and the radio receiver; and
a housing configured to protect the power source, the radio transmitter and the radio receiver, and enclose or be integral with the one or more sensors,
wherein:
the plurality of devices form a mesh network across which sensor data is propagated via the radio transmitters and the radio receivers; and
a device of the plurality of devices is configured to transmit sensor data to another of the plurality of devices when there is a change, or an appreciable change in sensor data compared to an earlier time point.

2. The system of claim 1, wherein each of the one or more sensors is a position/orientation sensor configured to sense the position/orientation of one of the plurality of devices at two or more time points, and/or the position/orientation of one of the plurality of devices relative to a point or region in space.

3. The system of claim 2 wherein the point or region in space is at or about that of another of the plurality of devices.

4. The system of claim 1, wherein each of the one or more sensors is selected from a group consisting of a water pressure sensor, an accelerometer, and an inertial measurement unit.

5. A method of installing a system of devices in a movable ground region of a mine, the method comprising:
providing a plurality of devices, each of which comprises:
one or more sensors configured to sense one or more parameters useful in determining movement and/or the potential for movement in a movable ground region of a mine and output the parameter as sensor data;
a radio transmitter configured to transmit sensor data to another of the plurality of devices;
a radio receiver configured to receive sensor data from another of the plurality of devices;
a power source configured to power the radio transmitter and the radio receiver; and
a housing configured to protect the power source, the radio transmitter and the radio receiver, and enclose or be integral with the sensor, wherein:
the plurality of devices form a mesh network across which sensor data is propagated via the radio transmitters and the radio receivers; and
one of the plurality of devices is configured to transmit sensor data to another of the plurality of devices when there is a change, or an appreciable change in sensor data compared to an earlier point in time; and
burying the plurality of devices within the movable ground region.

6. The method of claim 5 comprising, using a processor, receiving sensor data transmitted by the plurality of devices by a data receiving device and processing the received sensor data to determine movement or a potential for movement in or about the movable ground region in which the plurality of devices are disposed.

7. A device for monitoring a movable ground region in a mine for movement or the potential for movement, the device comprising:

one or more sensors configured to sense one or more parameters useful in determining movement and/or the potential for movement in a movable ground region of a mine and output the parameter as sensor data;

a radio transmitter configured to transmit sensor data to another of the plurality of devices;

a radio receiver configured to receive sensor data from another of the plurality of devices;

a power source configured to power the radio transmitter and the radio receiver; and a housing configured to protect the power source, the radio transmitter and the radio receiver, and enclose or be integral with the sensor, wherein the device is configured to transmit sensor data to a mesh network when there is a change, or an appreciable change in sensor data compared to an earlier time point.

* * * * *